(12) United States Patent
Chang et al.

(10) Patent No.: US 10,899,050 B2
(45) Date of Patent: Jan. 26, 2021

(54) INSERT-MOLDED COMPONENTS

(71) Applicant: HEWLETT-PACKARD DEVELOPMENT COMPANY, L.P., Houston, TX (US)

(72) Inventors: Chi Hao Chang, Taipei (TW); Kuan-Ting Wu, Taipei (TW); Yu-Ling Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 13 days.

(21) Appl. No.: 16/067,763

(22) PCT Filed: Apr. 4, 2016

(86) PCT No.: PCT/US2016/025843
§ 371 (c)(1),
(2) Date: Jul. 2, 2018

(87) PCT Pub. No.: WO2017/176237
PCT Pub. Date: Oct. 12, 2017

(65) Prior Publication Data
US 2019/0016028 A1  Jan. 17, 2019

(51) Int. Cl.
*C25D 11/06* (2006.01)
*C25D 11/02* (2006.01)
(Continued)

(52) U.S. Cl.
CPC .......... *B29C 45/0053* (2013.01); *B29C 39/10* (2013.01); *C25D 11/024* (2013.01);
(Continued)

(58) Field of Classification Search
CPC .................................................. C25D 11/026
See application file for complete search history.

(56) References Cited

U.S. PATENT DOCUMENTS

| | | | |
|---|---|---|---|
| 4,268,570 A | 5/1981 | Imanaka et al. | |
| 7,332,259 B2 * | 2/2008 | Takagi | B41N 3/038 205/214 |

(Continued)

FOREIGN PATENT DOCUMENTS

| | | |
|---|---|---|
| CN | 202123749 U | 3/2006 |
| CN | 101578019 | 11/2009 |

(Continued)

OTHER PUBLICATIONS

Machine translation Abstract of CN105019001 of Fang et al. (Year: 2015).*

(Continued)

*Primary Examiner* — Brian W Cohen
(74) *Attorney, Agent, or Firm* — HPI Patent Department (57) ABSTRACT

The present subject matter relates to fabrication of micro-arc oxidation (MAO) based insert-molded components. In an example implementation, a method of fabricating a MAO based insert-molded component comprises forming an insert-molded component and oxidizing the insert-molded component through MAO. The insert-molded component has a metal body molded with a plastic body. On oxidation of the insert-molded component through MAO an oxide layer is formed on the metal body.

17 Claims, 4 Drawing Sheets

(51) Int. Cl.
*C25D 11/30* (2006.01)
*C25D 11/34* (2006.01)
*C25D 11/04* (2006.01)
*B29C 45/00* (2006.01)
*B29C 39/10* (2006.01)
*B29C 45/14* (2006.01)
*B29K 101/12* (2006.01)
*B29K 705/00* (2006.01)
*B29K 509/08* (2006.01)

(52) U.S. Cl.
CPC ............ *C25D 11/026* (2013.01); *C25D 11/04* (2013.01); *C25D 11/06* (2013.01); *C25D 11/30* (2013.01); *C25D 11/34* (2013.01); *B29C 45/14* (2013.01); *B29C 2045/0079* (2013.01); *B29K 2101/12* (2013.01); *B29K 2509/08* (2013.01); *B29K 2705/00* (2013.01)

(56) References Cited

U.S. PATENT DOCUMENTS

| | | | |
|---|---|---|---|
| 7,820,300 B2* | 10/2010 | Dolan | C23C 4/02 428/472.2 |
| 2009/0035589 A1 | 2/2009 | Lee | |
| 2009/0041988 A1* | 2/2009 | Ho | C25D 11/04 428/172 |
| 2009/0047505 A1* | 2/2009 | Liu | C25D 11/04 428/332 |
| 2009/0223829 A1* | 9/2009 | Gao | C23C 18/1848 205/200 |
| 2009/0267266 A1 | 10/2009 | Lee et al. | |
| 2009/0280316 A1 | 11/2009 | Lee et al. | |
| 2009/0280347 A1 | 11/2009 | Yu et al. | |
| 2010/0112298 A1* | 5/2010 | Dai | C25D 11/18 428/172 |
| 2012/0031765 A1 | 2/2012 | Curran et al. | |
| 2013/0221816 A1* | 8/2013 | Liou | H05K 5/02 312/223.1 |
| 2014/0098502 A1* | 4/2014 | Lasarov | G06F 1/181 361/752 |
| 2015/0241921 A1 | 8/2015 | Gu et al. | |

FOREIGN PATENT DOCUMENTS

| | | | |
|---|---|---|---|
| CN | 103722668 | A | 4/2014 |
| CN | 104404601 | A * | 3/2015 |
| CN | 104735941 | A | 6/2015 |
| CN | 104735941 | A | 6/2015 |
| CN | 104838634 | | 8/2015 |
| CN | 105019001 | A * | 11/2015 |
| CN | 105204567 | A | 12/2015 |
| CN | 105204567 | A | 12/2015 |
| EP | 2817948 | | 1/2019 |
| WO | WO-2012076467 | A2 | 6/2012 |

OTHER PUBLICATIONS

Machine translation of Abstract of CN104404601 of Zhang et al. (Year: 2015).*
Machine translation of CN105204567 of Wang. (Year: 2015).*
Cai, Q et al, Electrochemical Performance of Microarc Oxidation films formed on AZ91D Magnesium Alloy in Silicate and Phosphate Electrolytes, Mar. 2006.

* cited by examiner

INSERT-MOLDED COMPONENTS

BACKGROUND

Insert-molded components generally have a metal body molded with a plastic body. The insert-molded components may be fabricated as top or back covers of electronic devices, such as televisions, computers, laptops, and Personal Digital Assistants (PDAs). The metal body in the insert-molded component may form metal contacts with electronic units within the electronic device.

BRIEF DESCRIPTION OF DRAWINGS

The following detailed description references the drawings, wherein.

DETAILED DESCRIPTION

For fabrication of insert-molded components, a metal body is generally manufactured by die-casting or molding processes at a molding machine. After manufacturing, the metal body may be packed for being transferred to an electrolytic oxidation bath where the metal body is oxidized through micro-arc oxidation (MAO) to form a metal oxide layer on the metal body. After the metal oxide layer is formed, the metal body may be re-packed and transferred to the molding machine for insert molding the metal body with a plastic body. Further, before insert molding the metal body with the plastic body, the metal body may have to be cleaned to reduce or eliminate non-uniformities in the metal oxide layer formed on the metal body. In addition, it may cause surface defects on the metal body during repacking, transporting and insert molding processes.

Repacking and transporting the metal body back to the molding machine after forming the metal oxide layer and the cleaning procedures performed before the insert molding significantly add to the production time of the insert-molded components. Also, high temperatures during oxidation of the metal body through MAO may result in discoloration and deformities in the insert-molded component, when the metal body is later insert molded with the plastic body. This reduces durability of the insert-molded components.

The present subject matter describes micro-arc oxidation (MAO) based insert-molded components, and methods of fabricating MAO based insert-molded components for electronic devices. The MAO based insert-molded components may be fabricated as insert-molded covers for electronic devices. The methods of the present subject matter facilitate in reducing the amount of handling and production time. As a result, the production and yield of MAO based insert-molded components is increased substantially. In addition, the MAO based insert-molded components fabricated by the methods of the present subject matter have higher structural stability, better durability, and a longer life span.

In an example implementation of a method of the present subject matter, a MAO based insert-molded component is fabricated by forming an insert-molded component having a metal body molded with a plastic body. After forming the insert-molded component, the insert-molded component is oxidized through MAO to form an oxide layer on the metal body. In an example implementation, the MAO of the insert-molded component is performed by immersing the insert-molded component in an electrolyte solution and periodically passing an electrical signal through the electrolyte solution to form an oxide layer on the metal body.

Since MAO for forming the oxide layer is performed after forming the insert-molded component, none of the components have to be repacked and taken back to the molding machine after the MAO. Also, since the metal body is substantially free of oxide layers before the insert molding, laborious cleaning procedures ordinarily performed prior to insert molding can be avoided. As a result, the amount of handling during the fabrication of the MAO based insert-molded components is reduced. Reduction in the amount of handling reduces the production time and increases the yield of MAO based insert-molded components.

Further, since the MAO is performed by periodically passing an electrical signal through an electrolyte solution in which the insert-molded component is immersed, the insert-molded component does not experience substantially high temperatures for long durations during the MAO. This reduces chances of discoloration and deformation of the MAO based insert molded component. As a result, the structural stability of the metal body, and the durability and life span of the MAO based insert-molded component increases.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
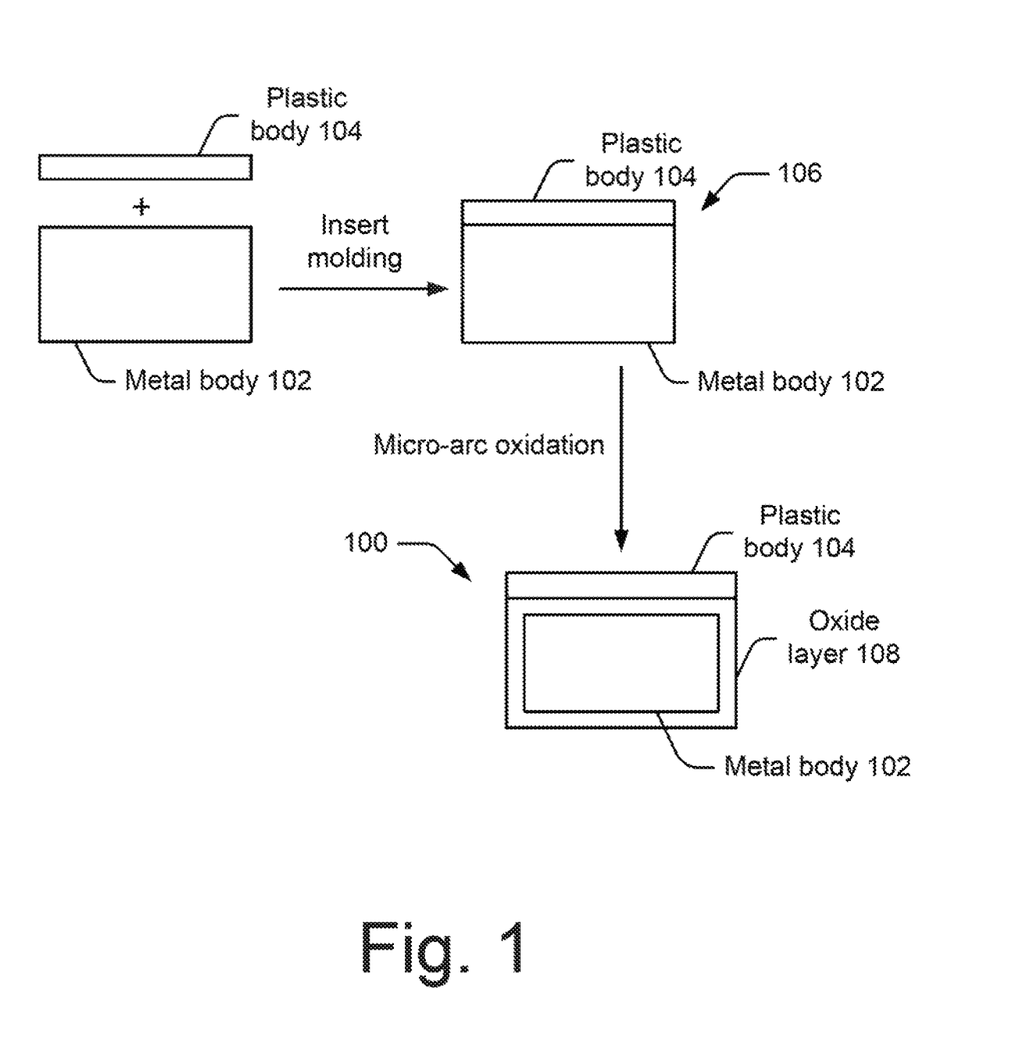
FIG. 1 illustrates different stages of fabrication of a micro-arc oxidation (MAO) based insert-molded component, according to an example implementation of the present subject matter.

FIG. 1 illustrates different stages of fabrication of a MAO based insert-molded component 100, according to an example implementation of the present subject matter. The insert-molded component may be fabricated as an insert-molded cover for an electronic device, such as a television, a computer, a laptop, a smartphone, a tablet and a PDA. In an example implementation, the insert molded cover may be one of a top C-cover of a laptop computer, a back cover or a top cover of a tablet, and a back cover or a top cover of a smartphone.

For fabrication of the MAO based insert-molded component 100, a metal body 102 is formed, for example, by a metal forming process, such as die-casting, forging, and molding. In an example implementation, the metal body 102 is formed from one of aluminum, magnesium, lithium, titanium zinc, and alloys of such metals.

The metal body 102 is molded with a plastic body 104 to form an insert-molded component 106, as shown in FIG. 1. The metal body 102 may be molded with the plastic body 104 through insert molding. In an example implementation, the plastic body 104 may be made of one of polybutylene terephthalate (PBT), polyphenylene sulfide (PPS), polyamide (nylon), polyphthalamide (PPA), acrylonitrile butadiene styrene (ABS), polyetheretherketone (PEEK), polycarbonate (PC), and ABS/PC with 15-50% glass fiber filler.

In an example implementation, after the insert-molded component 106 is formed, the insert-molded component 106 may be processed through polishing, degreasing, activating, and neutralizing, the surfaces of the metal body 102. The surfaces of the metal body 102 in the insert-molded component 106 may be polished using polishing agents, such as abrasives to remove surface irregularities, such as burrs on the surfaces of the metal body 102. In an example implementation, the surfaces of the metal body 102 may be polished through one of electro-polishing, mechanical polishing, and buffing.

After polishing, the surfaces of the metal body 102 may be degreased to remove impurities, such as fat, grease, and oil from the surfaces of the metal body 102. In an example implementation, the surfaces of the metal body 102 may be degreased through ultrasonic degreasing by using alkaline cleaners. The surfaces of the metal body 102 may also be degreased by passing hot water over the insert-molded component.

After degreasing, the surfaces of metal body 102 may be activated to remove any layer of natural oxides that may have formed on the metal body 102 due to exposure to the atmosphere. In an example implementation, the surfaces of metal body 102 may be activated through acid activation. Acids, such as nitric acid, acetic acid, and sulfuric acid may be used for acid activation. Acid activation also removes alkaline solutions that may get stuck to the metal body 102 while the metal body 102 is degreased using alkaline cleaners.

After activation, the surfaces of the metal body 102 may be neutralized. In an example implementation, the surfaces of the metal body 102 may be neutralized through alkaline neutralization using weak alkaline solutions, such as alkaline solutions of one of sodium carbonate, sodium hydroxide, ammonia and sodium hexametaphosphate.

After the insert-molded component 106 is processed, the insert-molded component 106 is oxidized through MAO to form an oxide layer 108 on the metal body 102. In an example implementation, MAO includes electrolysis of an electrolyte solution with the insert-molded component 106 immersed in the electrolyte solution. The electrolyte solution may be an alkaline solution of one of sodium silicate, metal phosphate, potassium fluoride, potassium hydroxide or sodium hydroxide, fluorozirconate, sodium hexametaphosphate, sodium fluoride, ferric ammonium oxalate, phosphoric acid salt, graphite powder, silicon dioxide powder, aluminum oxide powder, metal powder, and polyethylene oxide alkylphenolic ether. In an example implementation, the electrolyte solution has a concentration in a range of about 0.05% by volume to about 15% by volume and has a pH in a range of about 8 to about 13.

In an example implementation, the electrolyte solution may be kept inside an electrolytic bath and maintained at a temperature in a range of about 10 degree C. to about 45 degree C. The insert-molded component 106 is immersed in the electrolyte solution inside the electrolytic bath. The insert-molded component 106 acts as an electrode during electrolysis of the electrolyte solution. For electrolysis, an electrical signal at a voltage in a range of about 150 volts to about 550 volts is periodically passed through the electrolyte solution. In an example implementation, periodically passing the electrical signal includes passing the electrical signal through the electrolyte solution for a time duration in a range of about 2 minutes to about 3 minutes and then cutting off the electrical signal for a time duration in a range of about 5 seconds to about 20 seconds. This process of passing the electrical signal through the electrolyte solution and cutting off the electrical signal may be repeatedly performed for a definite time period of, for example, 20 minutes. At the end of the electrolysis, the oxide layer 108 is formed on the metal body 102.

The thickness of the oxide layer 108 depends on the definite time period for which the electrolysis is performed. In an example implementation, the oxide layer 108 has a thickness in a range of about 3 µm to about 15 µm. The oxide layer 108 may be formed of a metal oxide, or a combination of metal oxides. For example, when the metal body 102 is made of aluminum, then the oxide layer 108 is formed of aluminum oxide ($Al_2O_3$). In another example, when the metal body 102 is made of an alloy of magnesium, aluminum, and zinc, then the oxide layer 108 is formed of a combination of magnesium oxide, aluminum oxide, and zinc oxide.

After the oxide layer 108 is formed on the metal body 102, the MAO based insert-molded component 100 may be heated at a temperature in a range of 60° C. to 80° C. for a time duration in a range of 10 minutes to 30 minutes, to dry the oxide layer 108.

In an example implementation, after drying the oxide layer 108, several coats may be deposited on the MAO based insert-molded component 100 to enhance the heat resistive capacity, surface texture, and aesthetic appeal of the MAO based insert-molded component 100.

Figure 2:
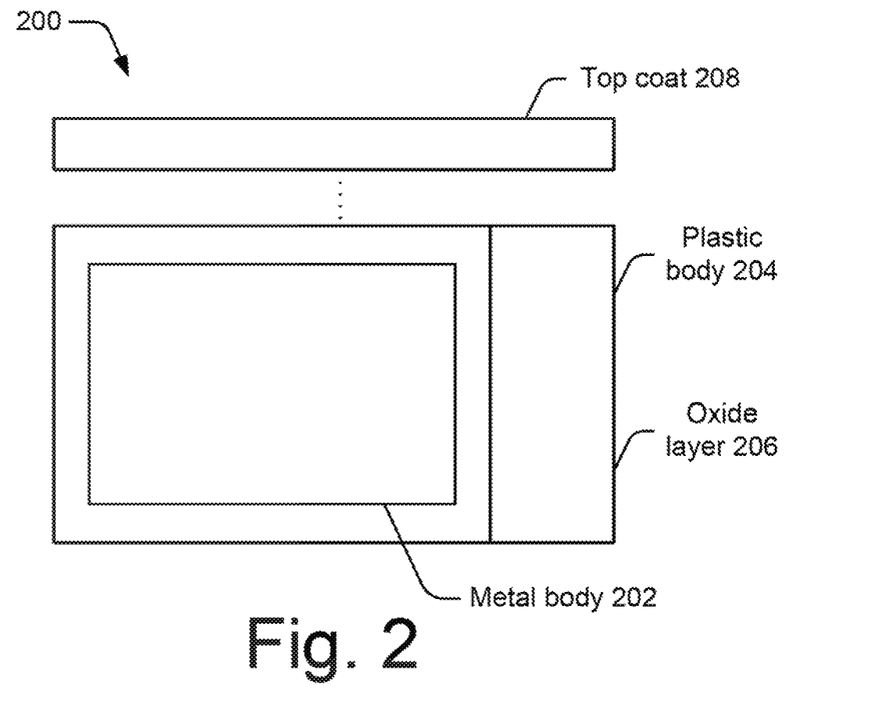
FIG. 2 illustrates a sectional view of a MAO based insert-molded component with a top coat deposited over the MAO based insert-molded component, according to an example implementation of the present subject matter.

FIG. 2 illustrates a sectional view of a MAO based insert-molded component 200 with a top coat deposited over the MAO based insert-molded component 200, according to an example implementation of the present subject matter. For fabricating the MAO based insert-molded component 200, a metal body 202 is molded with a plastic body 204 and an oxide layer 206 is formed on the metal body 102 through MAO, in a manner as described earlier with reference to FIG. 1.

In an example implementation, after forming the oxide layer 206 and drying, a top coat 208 is deposited over the insert-molded component. The top coat 208 has a thickness in a range of about 15 µm to about 60 µm. The top coat 202 may be deposited through spray coating on the insert-molded component. In an example implementation, the top coat is made of one of fluoroacrylates, fluorosilicone acrylates, fluorourethanes, perfluoropolyethers/perfluoropolyoxetanes, fluorotelomers, polytetrafluoroethylene (PTFE), polyvinylidenefluouride (PVDF), fluorosiloxane, and fluoro UV polymers. After depositing the top coat 202, the insert-molded component may be heated at a temperature in a range of 80 degree C. to 140 degree C. for a time duration in a range of 20 minutes to 40 minutes for curing the top coat.

In an example implementation, a base coat is deposited on the insert molded component through spray coating, prior to depositing the top coat 208. The base coat may have a thickness in a range of about 5 µm to about 20 µm. In an example implementation, the base coat may include one of barium sulfate, talc, dyes and color pigments. After depositing the base coat, the base coat may be cured by heating the insert-molded component at a temperature in a range of 80° C. to 150° C. for a time duration in a range of 20 minutes to 40 minutes. The top coat 208 is deposited on the base coat. The top coat 208 may be deposited through spray coating and then cured by heating as described earlier.

In an example implementation, a primer coat followed by a base coat are deposited on the insert-molded component through spray coating prior to depositing the top coat 208.

The primer coat may have a thickness in a range of about 10 µm to about 50 µm. In an example implementation, the primer coat may include one of carbon black, titanium dioxide, clay, mica, talc, barium sulfate, calcium carbonate, synthetic pigments, metallic powders, aluminum oxide, CNT, graphene, graphite, organic and inorganic powders. After depositing the primer coat, the primer coat may be cured by heating the insert-molded component at a temperature in a range of 80° C. to 160° C. for a time duration in a range of 20 minutes to 40 minutes. The base coat is deposited on the primer coat and the top coat 208 is deposited on the base coat. The base coat and the top coat may be deposited through spray coating and then cured by heating as described earlier.

In an example implementation, a powder coat is deposited on the insert-molded component prior to depositing the top coat 208. The powder coat may be deposited through electrostatic coating. The powder coat may have a thickness in a range of about 20 µm to about 120 µm. In an example implementation, the powder coat may include one of epoxy, poly(vinyl chloride), polyamides, polyesters, polyurethanes, acrylics, and polyphenylene ether. After depositing the powder coat, the powder coat may be cured by heating the insert-molded component at a temperature in a range of 120° C. to 190° C. for a time duration in a range of 20 minutes to 40 minutes. The top coat 208 is deposited on the powder coat. The top coat 208 may be deposited through spray coating and then cured by heating as described earlier.

In an example implementation, after the oxide layer 206 is formed, a powder coat may be deposited on the insert-molded component. A base coat may be deposited on the powder coat and the top coat 208 may be deposited on the base coat. As described earlier, the powder coat may be deposited through electrostatic coating and then cured by heating. The base coat and the top coat 208 may be deposited through spray coating and then cured by heating.

In an example implementation, a powder coat followed by a primer coat and a base coat may be deposited on the insert-molded component prior to depositing the top coat 208. The primer coat is deposited on the powder coat. The base coat is deposited on the primer coat, and the top coat 208 is deposited on the base coat. The powder coat may be deposited through electrostatic coating and then cured by heating as described earlier. The primer coat, the base coat, and the top coat 208 may be deposited through spray coating and then cured by heating as described earlier.

Figure 3:
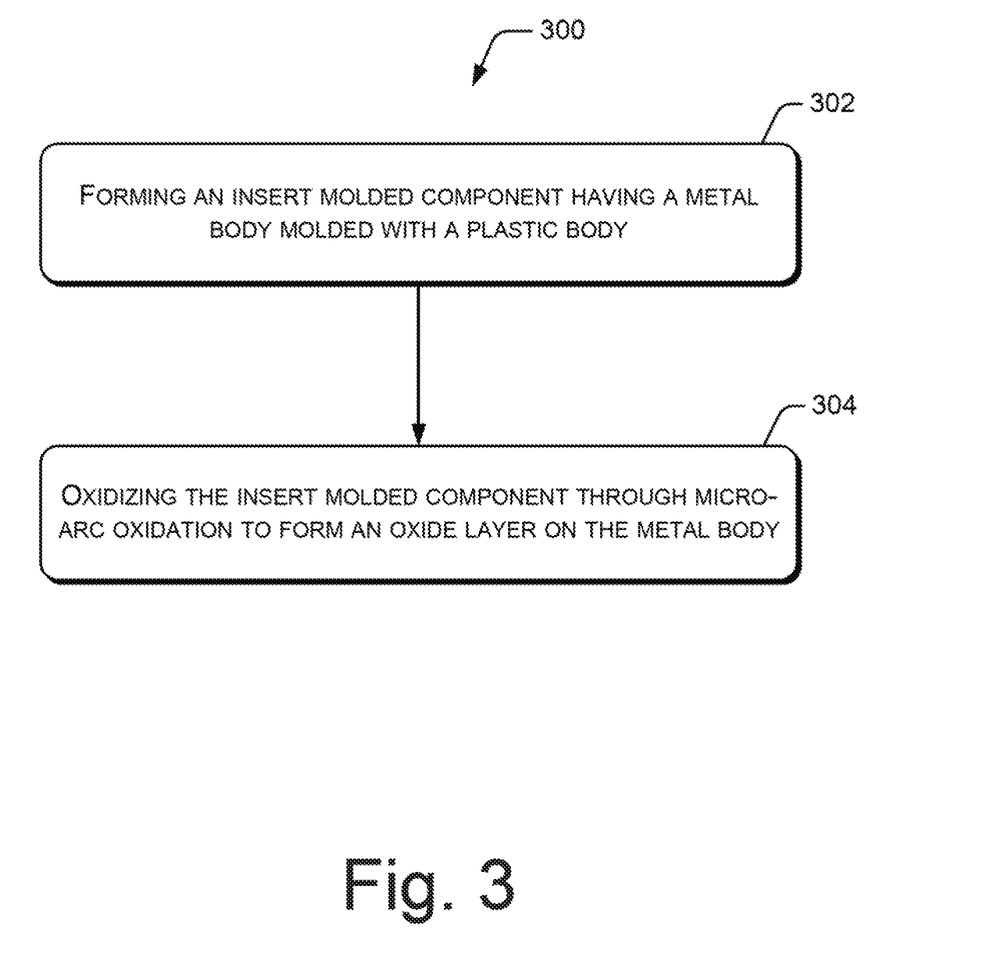
FIG. 3 illustrates a method of fabricating the MAO based insert-molded component, according to an example implementation of the present subject matter.

FIG. 3 illustrates a method 300 of fabricating a MAO based insert-molded component, according to an example implementation of the present subject matter.

As shown in FIG. 3, at block 302, an insert molded component having a metal body molded with a plastic body is formed. In an example implementation, the metal body may be molded with the plastic body through insert molding. The metal body may be made of one of aluminum, magnesium, lithium, titanium, zinc, and alloys of these metals. The plastic body may be made of polybutylene terephthalate (PBT), polyphenylene sulfide (PPS), polyamide (nylon), polyphthalamide (PPA), acrylonitrile butadiene styrene (ABS), polyetheretherketone (PEEK), polycarbonate (PC), and ABS/PC with 15-50% glass fiber filler.

After the insert-molded component is formed, the insert-molded component is oxidized through MAO to form an oxide layer on the metal body, at block 304. The detailed process for MAO of the insert-molded component is described with reference to FIG. 4. The oxide layer may be a metal oxide layer having a thickness in a range of 3 µm to 15 µm. In an example, when the metal body is made of aluminum, then the oxide layer is formed of aluminum oxide ($Al_2O_3$). In another example, when the metal body is made of an alloy of magnesium, aluminum, and zinc, then the oxide layer may be formed of a combination of aluminum oxide, zinc oxide, and magnesium oxide.

Figure 4:
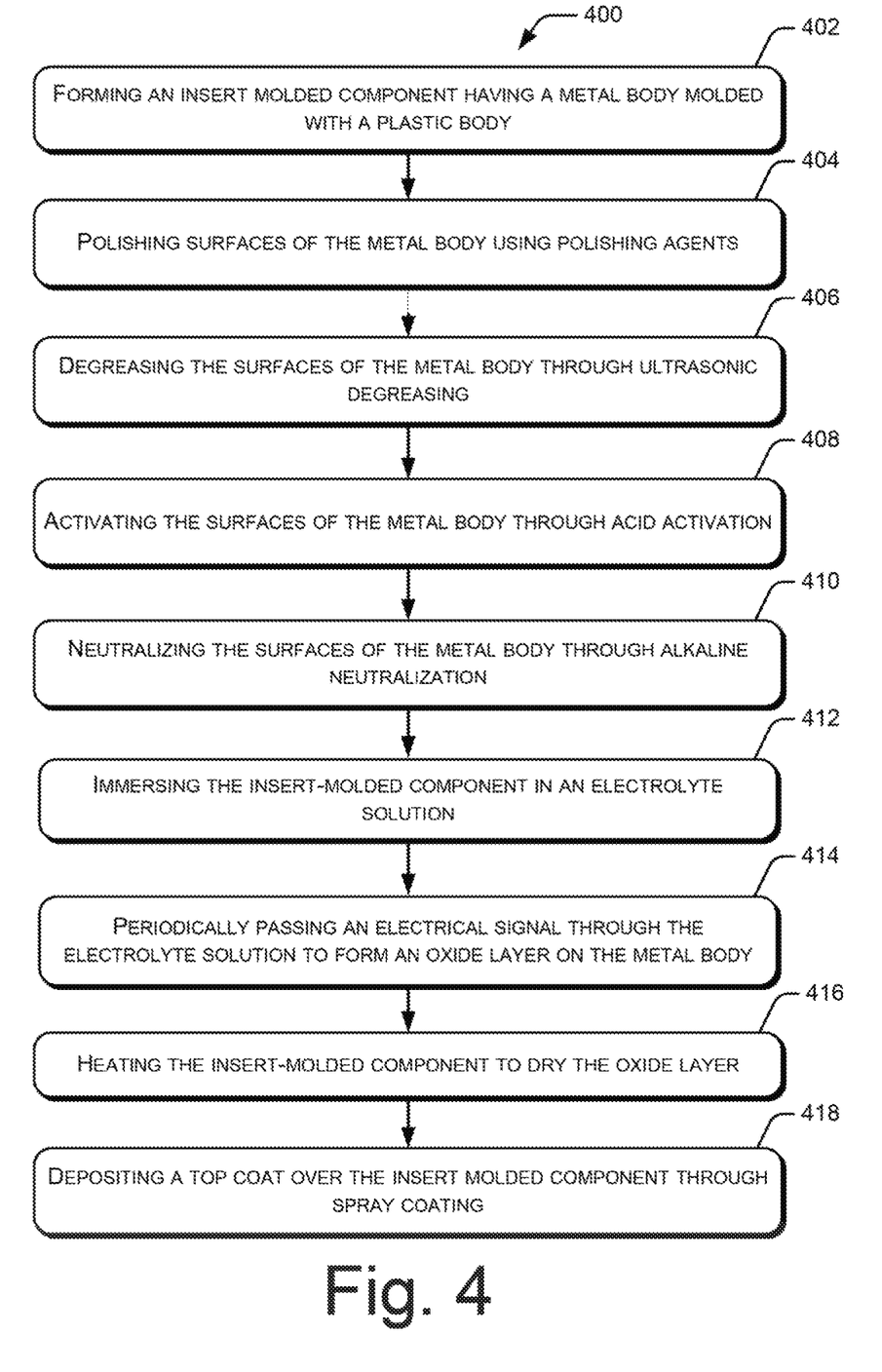
FIG. 4 illustrates a method of fabricating the MAO based insert-molded component, according to an example implementation of the present subject matter.

FIG. 4 illustrates a method 400 of fabricating the MAO based insert-molded component, according to an example implementation of the present subject matter. In an example implementation, the MAO based insert-molded component may be fabricated as an insert-molded cover for an electronic device. In an example implementation, the insert-molded cover may be one of a top C-cover of a laptop computer, a back cover or a top cover of a tablet, and a back cover or a top cover of a smartphone.

At block 402, an insert molded component having a metal body molded with a plastic body is formed. In an example implementation, the insert-molded component is formed through insert molding.

After the insert-molded component is formed, the insert-molded component may be processed to prepare the insert-molded component for MAO. Processing the insert-molded component includes polishing, degreasing, activating, and neutralizing the metal body. At block 404, surfaces of the metal body are polished using polishing agents, such as abrasives. The surfaces of the metal body may be polished through one of electro-polishing, mechanical polishing, and buffing to remove surface irregularities, such as burrs on the metal body.

After the surfaces of metal body 102 are polished, at block 406, the surfaces of the metal body are degreased through ultrasonic degreasing to remove impurities, such as fat, grease, or oil from the surfaces of the metal body. Degreasing may also be performed by passing hot water over the insert-molded component.

After the surfaces of metal body 102 are degreased, at block 408, the surfaces of the metal body are activated through acid activation to remove any layer of natural oxides that may have formed on the metal body. Acids, such as nitric acid, acetic acid, and sulfuric acid may be used for the acid activation.

After the acid activation, at block 410, the surfaces of the metal body are neutralized through alkaline neutralization using weak alkaline solutions, such as alkaline solutions of one of sodium carbonate, sodium hydroxide, ammonia and sodium hexametaphosphate.

After the neutralization, the insert-molded component is oxidized through MAO to form an oxide layer on the metal body. For MAO, the insert-molded component is immersed in an electrolyte solution at block 412. The electrolyte solution may be an alkaline solution of one of sodium silicate, metal phosphate, potassium fluoride, potassium hydroxide or sodium hydroxide, fluorozirconate, sodium hexametaphosphate, sodium fluoride, ferric ammonium oxalate, phosphoric acid salt, graphite powder, silicon dioxide powder, aluminum oxide powder, metal powder, and polyethylene oxide alkylphenolic ether. In an example implementation, the electrolyte solution has a concentration in a range of about 0.05% by volume to about 15% by volume and has a pH in a range of about 8 to about 13.

At block 414, an electrical signal is periodically passing through the electrolyte solution. In an example implementation, the electrical signal has a voltage in a range of 150 volts to 550 volts. The electrical signal may be passed through the electrolyte solution for a time duration in a range of 2 minutes to 3 minutes and then cut off for a time duration in a range of 5 seconds to 20 seconds. This process of passing and cutting off the electrical signal may be repeatedly performed for a definite time period of, for example, 20 minutes. At the end of the definite time period the oxide layer is formed on the metal body.

After the oxide layer is formed on the metal body, at block 416, the MAO based insert-molded component may be heated at a temperature in a range of 60° C. to 80° C. for a time duration in a range of 10 minutes to 30 minutes, to dry the oxide layer.

After drying the oxide layer, at block 418, a top coat is deposited over the insert-molded component through spray coating. In an example implementation, the top coat has a thickness in a range of about 15 μm to about 60 μm. In an example implementation, the top coat is made of one of fluoroacrylates, fluorosilicone acrylates, fluorourethanes, perfluoropolyethers/perfluoropolyoxetanes, fluorotelomers, polytetrafluoroethylene (PTFE), polyvinylidenefluouride (PVDF), fluorosiloxane, and fluoro UV polymers. After depositing the top coat, the insert-molded component may be heated at a temperature in a range of 80 degree C. to 140 degree C. for a time duration in a range of 20 minutes to 40 minutes for curing the top coat.

In an example implementation, a powder coat, a primer coat, a base coat, and a combination thereof may be coated on the insert-molded component prior to depositing the top coat, as described earlier with reference to FIG. 2.

Although implementations for methods of fabricating MAO based insert-molded components, and MAO based insert-molded components fabricated by the methods are described in language specific to methods and/or structural features, it is to be understood that the present subject matter is not limited to the specific methods or features described. Rather, the methods and specific features are disclosed and explained as example implementations for methods of fabricating MAO based insert-molded components and MAO insert-molded components fabricated by the methods.

We claim:

1. A method of fabricating a micro-arc oxidation (MAO) based insert-molded component, the method comprising:
    forming an insert-molded component having a metal body molded with a plastic body; and
    oxidizing the insert-molded component through MAO to form an oxide layer on the metal body, wherein oxidizing further comprises:
        immersing the insert-molded component in an electrolyte solution that has a pH in a range of 8 to 13;
        periodically passing an electrical signal through the electrolyte solution for 2 minutes to 3 minutes at a voltage in a range of 150 volts to 550 volts and at a temperature in a range of 10 degree C. to 45 degree C.; and
        cutting off the electrical signal for a time duration for a range of 5 seconds to 20 seconds.

2. The method of claim 1, wherein the electrolyte solution has a concentration in a range of 0.05% by volume to 15% by volume.

3. The method of claim 1, further comprising:
    heating the insert-molded component at a temperature in a range of 60° C. to 80° C. for a time duration in a range of 10 minutes to 30 minutes, after oxidizing the insert-molded component, to dry the oxide layer.

4. The method of claim 1, wherein prior to oxidizing the insert-molded component, the method further comprises:
    polishing surfaces of the metal body using polishing agents;
    degreasing the surfaces of the metal body through ultrasonic degreasing;
    activating the surfaces of the metal body through acid activation; and
    neutralizing the surfaces of the metal body through alkaline neutralization.

5. The method of claim 1, wherein the oxide layer has a thickness in a range of 3 μm to 15 μm.

6. The method of claim 1, wherein the metal body is made of one of aluminum, magnesium, lithium, titanium, zinc, and a combination thereof.

7. The method of claim 1, wherein the plastic body is made of one of polybutylene terephthalate (PBT), polyphenylene sulfide (PPS), polyamide (nylon), polyphthalamide (PPA), polyetheretherketone (PEEK), acrylonitrile butadiene styrene (ABS) polycarbonate (PC), and ABS/PC with 15-50% glass fiber filler.

8. The method of claim 1, further comprising:
    depositing a top coat over the insert-molded component through spray coating after oxidizing the insert-molded component, wherein the top coat is made of one of fluoroacrylates, fluorosilicone acrylates, fluorourethanes, perfluoropolyethers/perfluoropolyoxetanes, fluorotelomers, polytetrafluoroethylene (PTFE), polyvinylidenefluouride (PVDF), fluorosiloxane, and fluoro UV polymers; and
    heating the insert-molded component at a temperature in a range of 80 degree C. to 140 degree C. for a time duration in a range of 20 minutes to 40 minutes, for curing the top coat.

9. The method of claim 8, wherein the top coat has a thickness in a range of 15 μm to 60 μm.

10. A method of fabricating a micro-arc oxidation (MAO) based insert-molded cover for an electronic device, the method comprising:
    molding a metal body with a plastic body to form an insert-molded cover for the electronic device;
    immersing the insert-molded cover in an electrolyte solution that has a pH in a range of 8 to 13;
    periodically passing an electrical signal through the electrolyte solution for 2 minutes to 3 minutes at a voltage in a range of 150 volts to 550 volts and at a temperature in a range of 10 degree C. to 45 degree C., to form an oxide layer on the metal body; and
    cutting off the electrical signal for a time duration for a range of 5 seconds to 20 seconds.

11. The method of claim 10, wherein the electrolyte solution has a concentration in a range of 0.05% by volume to 15% by volume.

12. The method of claim 10, further comprising:
    heating the insert-molded cover at a temperature in a range of 60° C. to 80° C. for a time duration in a range of 10 minutes to 30 minutes, after oxidizing the insert-molded cover, to dry the oxide layer.

13. The method of claim 10, further comprising:
    depositing at least a top coat over the insert-molded cover through spray coating after oxidizing the insert-molded cover, wherein the top coat is made of one of fluoroacrylates, fluorosilicone acrylates, fluorourethanes, perfluoropolyethers/perfluoropolyoxetanes, fluorotelomers, polytetrafluoroethylene (PTFE), polyvinylidenefluouride (PVDF), fluorosiloxane, and fluoro UV polymers; and
    heating the insert-molded cover at a temperature in a range of 80 degree C. to 140 degree C. for a time duration in a range of 20 minutes to 40 minutes.

14. The method of claim 8, further comprising:
    depositing a base coat on the insert-molded component through spray coating prior to depositing the top coat, the base coat having a thickness of 5 μm to 20 μm, the base coat is made of one of barium sulfate, talc, dyes and color pigments; and heating the insert-molded cover to cure the base coat at a temperature in a range of 80 degree C. to 150 degree C. for a time duration in a range of 20 minutes to 40 minutes.

15. The method of claim 14, further comprising:

depositing a primer coat on the insert-molded component through spray coating prior to depositing the base coat, the primer coat having a thickness of 10 μm to 50 μm, the primer coat is made of one of carbon black, titanium dioxide, clay, mica, talc, barium sulfate, calcium carbonate, synthetic pigments, metallic powders, aluminum oxide, CNT, graphene, graphite, organic and inorganic powders; and heating the insert-molded cover to cure the primer coat at a temperature in a range of 80 degree C. to 160 degree C. for a time duration in a range of 20 minutes to 40 minutes.

16. The method of claim 8, further comprising:

depositing a powder coat on the insert-molded component through electrostatic coating prior to depositing the top coat, the powder coat having a thickness of 20 μm to 120 μm, the powder coat is made of one of epoxy, poly (vinyl chloride), polyamides, polyesters, polyurethanes, acrylics, and polyphenylene ether; and heating the insert-molded cover to cure the powder coat at a temperature in a range of 120 degree C. to 190 degree C. for a time duration in a range of 20 minutes to 40 minutes.

17. The method of claim 4, wherein the alkaline neutralization uses weak alkaline solutions, including one of sodium carbonate, sodium hydroxide, ammonia and sodium hexametaphosphate.

* * * * *